United States Patent
Buchake

(10) Patent No.: US 12,100,384 B2
(45) Date of Patent: Sep. 24, 2024

(54) DYNAMIC ADJUSTMENT OF CONTENT DESCRIPTIONS FOR VISUAL COMPONENTS

(71) Applicant: Capital One Services, LLC, McLean, VA (US)

(72) Inventor: Varshada Buchake, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 313 days.

(21) Appl. No.: 17/646,907

(22) Filed: Jan. 4, 2022

(65) Prior Publication Data

US 2023/0230577 A1    Jul. 20, 2023

(51) Int. Cl.
    *G10L 15/22*    (2006.01)
    *G10L 13/04*    (2013.01)
    *G10L 13/06*    (2013.01)
    *G10L 13/08*    (2013.01)

(52) U.S. Cl.
    CPC .............. *G10L 13/08* (2013.01); *G10L 13/04* (2013.01); *G10L 13/06* (2013.01)

(58) Field of Classification Search
    CPC ......... G10L 15/22; G10L 13/00; G10L 13/08; G10L 13/04; G10L 13/06; G10L 13/033; G06F 3/04845; G06F 16/9577; G06F 40/103; G06F 40/106; G06F 40/157; G06F 40/247
    See application file for complete search history.

(56) References Cited

U.S. PATENT DOCUMENTS

| | | | |
|---|---|---|---|
| 7,334,183 B2 | 2/2008 | Rusnak et al. | |
| 8,447,285 B1 * | 5/2013 | Bladon | H04M 7/0012 379/85 |
| 8,825,486 B2 | 9/2014 | Meyer et al. | |
| 10,938,868 B2 * | 3/2021 | Mastrangelo | H04L 65/104 |
| 10,978,062 B1 * | 4/2021 | Vanderschaegen | H04N 21/4131 |
| 11,449,286 B1 * | 9/2022 | Rahamathjan | G06F 3/1253 |
| 11,537,781 B1 * | 12/2022 | Krishnaswamy | G06F 40/109 |
| 11,853,341 B2 * | 12/2023 | Doken | G06F 40/279 |
| 11,979,461 B2 * | 5/2024 | Binder | G07C 3/02 |
| 2006/0155544 A1 * | 7/2006 | Chu | G10L 13/08 704/E13.012 |
| 2006/0195477 A1 * | 8/2006 | Deem | G06F 16/252 |
| 2007/0078656 A1 * | 4/2007 | Niemeyer | G10L 13/00 704/260 |
| 2007/0100628 A1 * | 5/2007 | Bodin | G10L 13/033 704/E13.004 |

(Continued)

*Primary Examiner* — Jakieda R Jackson
(74) *Attorney, Agent, or Firm* — Harrity & Harrity, LLP

(57) ABSTRACT

In some implementations, a mobile application may receive at least one string included in at least one content description associated with at least one visual component of a screen generated by a mobile application. The mobile application may apply a function to the at least one string, wherein the function performs a targeted replacement of characters included in the at least one string based on at least one optimization associated with a text-to-speech algorithm. Accordingly, the mobile application may receive output from the function that includes at least one modified string based on the at least one string and generate an audio signal, based on the at least one modified string, using the text-to-speech algorithm.

20 Claims, 5 Drawing Sheets

(56) References Cited

U.S. PATENT DOCUMENTS

| | | | | |
|---|---|---|---|---|
| 2009/0006099 | A1* | 1/2009 | Sharpe | G06F 3/167 704/E15.001 |
| 2009/0043583 | A1* | 2/2009 | Agapi | G10L 13/04 704/260 |
| 2010/0082328 | A1* | 4/2010 | Rogers | G10L 13/08 704/8 |
| 2010/0082329 | A1* | 4/2010 | Silverman | G10L 15/005 704/8 |
| 2011/0145759 | A1* | 6/2011 | Leffert | G06F 3/04847 715/800 |
| 2011/0202344 | A1* | 8/2011 | Meyer | G10L 13/04 704/260 |
| 2012/0284024 | A1* | 11/2012 | Mahalingam | H04M 1/642 704/235 |
| 2012/0304057 | A1* | 11/2012 | Labsky | G10L 13/00 715/256 |
| 2013/0080173 | A1* | 3/2013 | Talwar | G10L 25/69 704/260 |
| 2014/0019135 | A1* | 1/2014 | Talwar | G10L 13/08 704/E13.011 |
| 2014/0272908 | A1* | 9/2014 | Black | G09B 5/08 434/362 |
| 2014/0335497 | A1* | 11/2014 | Gal | G09B 7/00 434/323 |
| 2015/0286873 | A1* | 10/2015 | Davis | G06F 1/1694 382/103 |
| 2015/0365809 | A1* | 12/2015 | Lemberg | G10L 13/08 455/404.1 |
| 2016/0093289 | A1* | 3/2016 | Pollet | G10L 13/08 704/260 |
| 2016/0156771 | A1* | 6/2016 | Lee | H04M 1/724 455/414.1 |
| 2016/0379643 | A1* | 12/2016 | Ito | G10L 15/1822 704/270.1 |
| 2017/0132016 | A1* | 5/2017 | Zilberman | B60K 37/06 |
| 2017/0133005 | A1* | 5/2017 | Mason | G10L 21/007 |
| 2018/0018302 | A1* | 1/2018 | Vasiltschenko | G06F 40/47 |
| 2020/0045519 | A1* | 2/2020 | Raleigh | H04M 15/765 |
| 2020/0092519 | A1* | 3/2020 | Shin | G10L 17/00 |
| 2020/0294401 | A1* | 9/2020 | Kerecsen | G08G 1/205 |
| 2022/0326816 | A1* | 10/2022 | Walkin | G06F 3/0482 |
| 2022/0374130 | A1* | 11/2022 | Pu | G06F 1/3209 |
| 2023/0034967 | A1* | 2/2023 | Nathwani | G06F 3/04845 |
| 2023/0169967 | A1* | 6/2023 | Cronin | G06F 16/345 704/257 |

* cited by examiner

DYNAMIC ADJUSTMENT OF CONTENT DESCRIPTIONS FOR VISUAL COMPONENTS

BACKGROUND

Mobile applications often include visual assist modes where visual components (e.g., text information, buttons, and/or other graphical user interface (GUI) components) are converted to audio signals using a text-to-speech algorithm. Accordingly, visually impaired users may use the mobile applications via an audio-based experience.

SUMMARY

Some implementations described herein relate to a system for dynamically adjusting content descriptions for visual components. The system may include one or more memories and one or more processors communicatively coupled to the one or more memories. The one or more processors may be configured to receive at least one string included in at least one content description associated with at least one visual component of a screen generated by a mobile application. The one or more processors may be further configured to apply a function to the at least one string, where the function performs a targeted replacement of characters included in the at least one string based on at least one optimization associated with a text-to-speech algorithm. The one or more processors may be configured to receive output from the function that includes at least one modified string based on the at least one string. The one or more processors may be further configured to generate an audio signal, based on the at least one modified string, using the text-to-speech algorithm.

Some implementations described herein relate to a method of dynamically adjusting content descriptions for visual components. The method may include receiving at least one string included in at least one content description associated with at least one visual component of a screen generated by a mobile application. The method may further include applying a function to the at least one string, where the function adds characters to the at least one string based on context associated with the at least one string. The method may include receiving output from the function that includes at least one modified string based on the at least one string. The method may further include generating an audio signal, based on the at least one modified string, using a text-to-speech algorithm.

Some implementations described herein relate to a non-transitory computer-readable medium that stores a set of instructions for dynamically adjusting content descriptions for visual components for a device. The set of instructions, when executed by one or more processors of the device, may cause the device to provide a first function accepting, as input, at least one string and generating, as output, at least one modified string, where the first function performs a targeted replacement of characters included in the at least one string based on at least one optimization associated with a text-to-speech algorithm. The set of instructions, when executed by one or more processors of the device, may cause the device to provide a second function accepting, as input, at least one string and generating, as output, at least one modified string, where the second function adds characters to the at least one string based on context associated with the at least one string.

DETAILED DESCRIPTION

The following detailed description of example implementations refers to the accompanying drawings. The same reference numbers in different drawings may identify the same or similar elements.

Visual components associated with a mobile application are often associated with text-based descriptions of the visual components. For example, mobile applications on the Android® operating system associate each visual component with a "content description" field that includes a text-based description of the visual component. Similarly, mobile applications on the iOS® operating system associate each visual component with an "accessibility identifier" field that includes a text-based description of the visual component. However, text-to-speech algorithms often do not process acronyms and abbreviations well. Additionally, visually impaired users may sometimes benefit from additional contextual information regarding the visual components.

Modifying the content descriptions for visual components can be done each time the mobile application is re-compiled, and a new build released. However, this costs significant computational resources and does not offer flexibility to update content descriptions dynamically. Additionally, for text information that is received from a remote server (e.g., search results and/or other dynamic information), the content descriptions for the text information can be modified at the server. However, this can cost significant computational resources at the server (e.g., when there are hundreds or even thousands of search results, each associated with a separate content description) as well as network resources (e.g., by transmitting larger content descriptions over a network to the mobile application) such that latency is increased.

Some implementations described herein provide for a dynamic library that modifies content descriptions, on the fly, to optimize text for audio signal generation. The dynamic library uses significantly fewer computational resources as compared with re-compiling the mobile application and/or performing modification server-side. Additionally, the dynamic library may be updated once for use by multiple mobile applications, rather than each mobile application being re-compiled and updated, which further conserves computational resources. Finally, by optimizing content descriptions locally, network resources are conserved because remote servers may transmit shorter content descriptions that are subsequently optimized at a mobile device.

Figure 1A:
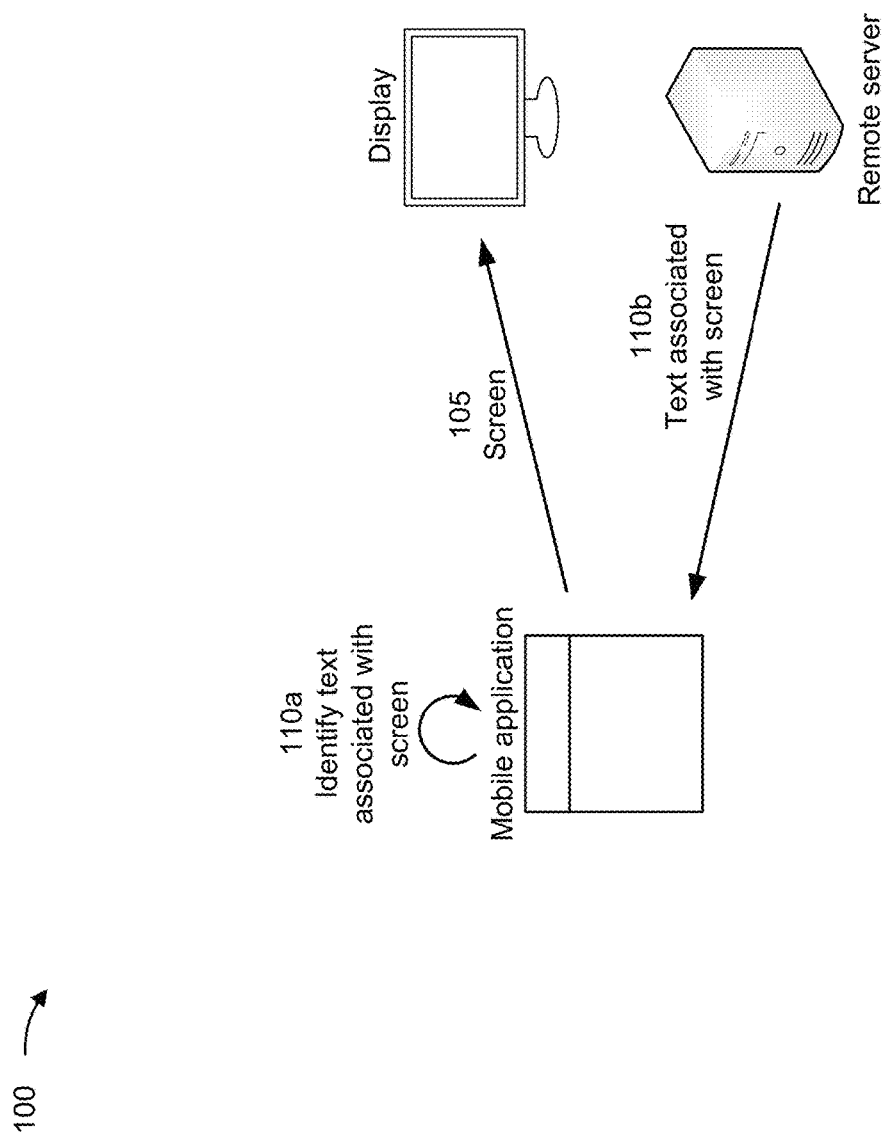
FIGS. 1A-1B are diagrams of an example implementation relating to dynamically adjusting content descriptions for visual components.
Figure 1B:
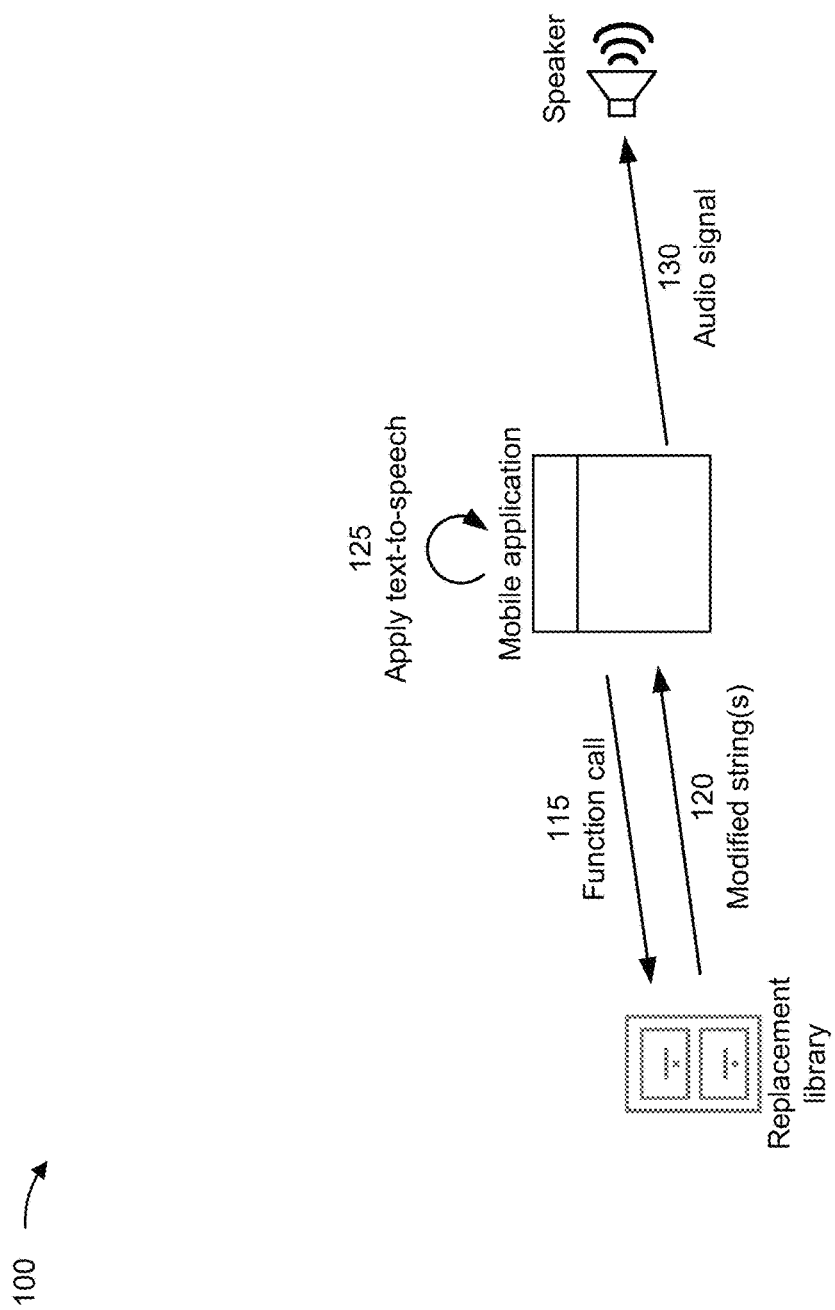

FIGS. 1A-1B are diagrams of an example 100 associated with dynamically adjusting content descriptions for visual components. As shown in FIGS. 1A-1B, example 100 includes a mobile application (e.g., executed on a mobile device), a replacement library (e.g., stored on the mobile device), a speaker and a display (e.g., associated with the mobile device), and a remote server. These devices are described in more detail in connection with FIGS. 2 and 3.

As shown in FIG. 1A and by reference number 105, the mobile application may generate a screen and transmit the screen to the display. For example, the screen may comprise a GUI and include visual components (e.g., at least one visual component). The visual components may include information for display to a user of the mobile device (e.g., text information and/or visual information, such as a graph or other image), interactive components (e.g., buttons, drop-down selectors, radio buttons, and/or other interactive components), or a combination thereof.

As further shown in FIG. 1A, the mobile application may receive a string (e.g., at least one string) included in a content description (e.g., at least one content description) associated with a visual component (e.g., at least one visual component) of the screen generated by the mobile application. For example, the mobile application may receive the string while generating the screen for transmission to the display. In some implementations, as shown by reference number 110a, the mobile application may receive the string from a library of strings stored (e.g., on the mobile device) in association with the mobile application. For example, the string may be coded into the mobile application (e.g., included as a constant in the executable file storing code for the mobile application) or may be included a separate file from which the mobile application is configured to pull strings for generating visual components (e.g., included in a library file associated with the mobile application).

As an alternative, and as shown by reference number 110b, the mobile application may receive the string from the remote server. For example, the mobile application may request search results and/or other information (whether text and/or visual) from the remote server such that the string is included in a content description transmitted from the remote server to the mobile application with the information.

Accordingly, as shown in FIG. 1B, the mobile application may apply a function to the string that performs a targeted replacement of characters included in the string based on an optimization (e.g., at least one optimization) associated with a text-to-speech algorithm. For example, as shown by reference number 115, the mobile application may perform a call to the function. In some implementations, the function may be integrated with a class that is associated with the string. For example, the string may be an instance of a string class, and the function may be provided as a public function for the string class. By providing the function as a public function for the string class, the function may be readily updated separate from a file (e.g., one or more files) that store the code for the mobile application. Accordingly, the function may be updated once for use by multiple mobile applications, which conserves memory and processing resources on the mobile device.

Additionally, or alternatively, the function may be stored in a library accessible by the mobile application. For example, the function may be stored in a shared object, a framework folder, a dynamic link library, and/or another similar library data structure storing code for the function. Accordingly, the mobile application may call the function with the string as a parameter. For example, the function may be accessible through an application programming interface (API) that accepts the string as a parameter.

In some implementations, the optimization may be associated with a set of characters for replacing an acronym. For example, the function may search for acronyms within the string (e.g., by applying a string match within a sliding window, optionally using parentheses, spaces, capitals, and/or other formatting clues to identify acronyms with greater accuracy) and replace identified acronyms with corresponding sets of characters associated with the optimization. For example, the function may replace "MBS" with "Mortgage Backed Security or EM BEE ESS" or "JPEG" with "image file format JAY PEG" to improve conversion of the string into an audio signal (e.g., as described in connection with reference number 125). Accordingly, the function may replace acronyms based on phonetics associated with the text-to-speech algorithm. In another example, the function may replace "LIBOR" with "London interbank offered rate" or "ROI" with "return on investment" to improve conversion of the string into an audio signal (e.g., as described in connection with reference number 125). Accordingly, the function may additionally or alternatively replace acronyms with longer words or phrases associated with the acronyms.

Additionally, or alternatively, the optimization may be associated with a set of characters for replacing an abbreviation. For example, the function may search for abbreviations within the string (e.g., by applying a string match within a sliding window, optionally using periods, spaces, and/or other formatting clues to identify acronyms with greater accuracy) and replace identified abbreviations with corresponding sets of characters associated with the optimization. For example, the function may replace "e.g." with "Latin phrase EE JEE" or "Ave" with "Avenue" to improve conversion of the string into an audio signal (e.g., as described in connection with reference number 125). Accordingly, the function may replace abbreviations based on phonetics associated with the text-to-speech algorithm. In another example, the function may replace "January" with "January" or "mos." with "months" to improve conversion of the string into an audio signal (e.g., as described in connection with reference number 125). Accordingly, the function may additionally or alternatively replace abbreviations with longer words or phrases associated with the abbreviations.

Additionally, or alternatively, the optimization may be associated with a set of characters for replacing a term or a phrase. For example, the function may search for one or more stored terms (or phrases) within the string (e.g., by applying a string match within a sliding window, optionally using periods, spaces, and/or other formatting clues to identify the terms with greater accuracy) and replace identified terms (or phrases) with corresponding sets of characters associated with the optimization. For example, the function may replace "c'est la vie" with "French phrase SAY LAA VEE" or "modus operandi" with "Latin term EMM OH" to improve conversion of the string into an audio signal (e.g., as described in connection with reference number 125). Accordingly, the function may replace terms (or phrases) based on phonetics associated with the text-to-speech algorithm. In another example, the function may replace numerical dates (e.g., in the format ##/ ##/ #### or ##/ ##/ ##) with textual dates (e.g., with months spelled out and/or ordinal numbers in lieu of cardinal numbers for days) or numerical years (e.g., in the format 19 ## or 20 ##) with textual numbers (e.g., NINETEEN NINETY-NINE for 1999 or TWO THOUSAND FIVE for 2005) to improve conversion of the string into an audio signal (e.g., as described in connection with reference number 125). Accordingly, the function may additionally or alternatively replace terms (or phrases) with longer versions of the terms (or phrases).

Although described above as the same function, the mobile application may apply different functions to apply optimizations associated with acronyms, abbreviations, and/ or terms (or phrases), respectively. Additionally, or alternatively, the mobile application may apply a function to the string that adds characters to the string based on context associated with the string. For example, the function may add "the Annual Percentage Rate is calculated based on the interest rate for the loan, fees charged with the loan, and any points you choose to purchase" whenever "APR" appears. In another example, the function may add "there is an outstanding recall for all TWO THOUSAND TEN TO TWO THOUSAND FOURTEEN Chevy Camaros" whenever "Chevy Camaro" appears near a year in a range from 2010 to 2014. Although described above as a different function, the mobile application may call a single function to apply optimizations associated with acronyms, abbreviations, and/or terms (or phrases) in combination with an optimization to add characters based on context.

Accordingly, as shown by reference number 120, the mobile application may receive output from the function that includes a modified string (e.g., at least one modified string) based on the string. For example, the function may return the modified string to the mobile application through the API used to call the function.

In some implementations, the modified string is based on whether the text-to-speech algorithm uses concatenative synthesis or uses formant synthesis. For example, the modified string may include vowel and consonant symbols for formant synthesis (e.g., using international phonetic alphabet (IPA) symbols for vowels and consonants). On the other hand, the modified string may include phonetic spelling for concatenative synthesis (e.g., spelling out pronunciations). Accordingly, the function may accept, as input, an indication of which text-to-speech algorithm is being used. The function may accept this input from the mobile application and/or may query an operating system of the mobile device to determine which text-to-speech algorithm is being used.

As shown in FIG. 1B, the function may be stored in a library separate from the mobile application. Accordingly, the mobile device may update the function by updating a library file (e.g., at least one library file) storing code for the function. As a result, the function may be updated once for use by multiple mobile applications, which conserves memory and processing resources on the mobile device.

In some implementations, the library may provide a plurality of functions that perform the operations described above. For example, the library may provide a first function accepting, as input, a string (e.g., at least one string) and generating, as output, a modified string (e.g., at least one modified string) based on a targeted replacement of characters included in the string based on an optimization (e.g., at least one optimization) associated with a text-to-speech algorithm. Additionally, the library may provide a second function accepting, as input, a string (e.g., at least one string) and generating, as output, a modified string (e.g., at least one modified string) by adding characters to the string based on context associated with the string. Accordingly, the mobile application may execute the first function based on an API call to the first function. Similarly, the mobile application may execute the second function based on an API call to the second function. Additionally, in some implementations, the functions may be stored across different files (or other data structures). Accordingly, the mobile device may update the first function by updating a library file (e.g., at least one library file) storing code for the first function and update the second function by updating a library file (e.g., at least one library file) storing code for the second function. As a result, each function may be separately updated with minimal read and write cycles to a memory of the mobile device, which conserves power and processing resources on the mobile device.

In any of the implementations described above, the library may verify an API call before executing a function (e.g., the first function, the second function, and/or another function performing operations described above) based on the API call. For example, the mobile application may provide a password, a certificate, and/or another digital form of authentication (e.g., as a parameter in the API call) in order to use the library. Accordingly, the library is protected against unauthorized access (e.g., from distributed denial of service (DDOS) attacks and/or other unauthorized applications).

As shown by reference number 125, the mobile application may generate an audio signal, based on the modified string, using the text-to-speech algorithm. In some implementations, the mobile application may include the text-to-speech algorithm. As an alternative, the operating system of the mobile device may provide access to the text-to-speech algorithm such that the mobile application may call the text-to-speech algorithm (e.g., via an API call) and provide the modified string as a parameter.

Accordingly, as shown by reference number 130, the mobile application may output the generated audio signal to a speaker. The speaker may be at least partially integrated (e.g., physically, logically, and/or virtually) with the mobile device. Alternatively, the speaker may be separate from, but associated with, the mobile device (e.g., a wireless speaker that is connected to the mobile device or a wired speaker that is plugged into the mobile device, among other examples).

Using techniques as described in connection with FIGS. 1A-1B increases accuracy of the generated audio signal while conserving a significant amount of power, memory, and processing resources. Performing string modifications to improve accuracy, as described above, uses a small amount of power, memory, and processing resources as compared with re-training or otherwise modifying the text-to-speech algorithm to improve accuracy.

As indicated above, FIGS. 1A-1B are provided as an example. Other examples may differ from what is described with regard to FIGS. 1A-1B.

Figure 2:
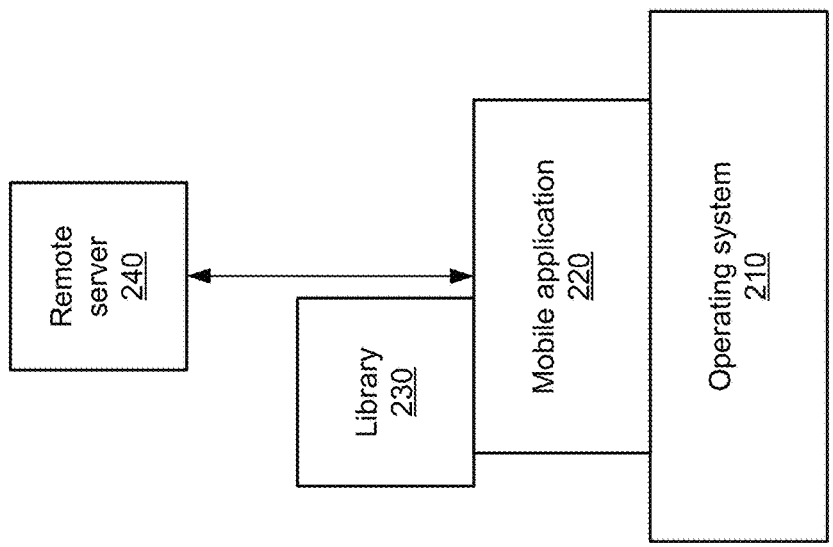
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an operating system 210, a mobile application 220 (e.g., supported by the operating system 210), and a library 230 (e.g., used by the mobile application 220), as described in more detail below. Additionally, as further shown in FIG. 2, environment 200 may include a remote server 240. Devices and/or elements of environment 200 may interconnect via wired connections and/or wireless connections.

Figure 3:
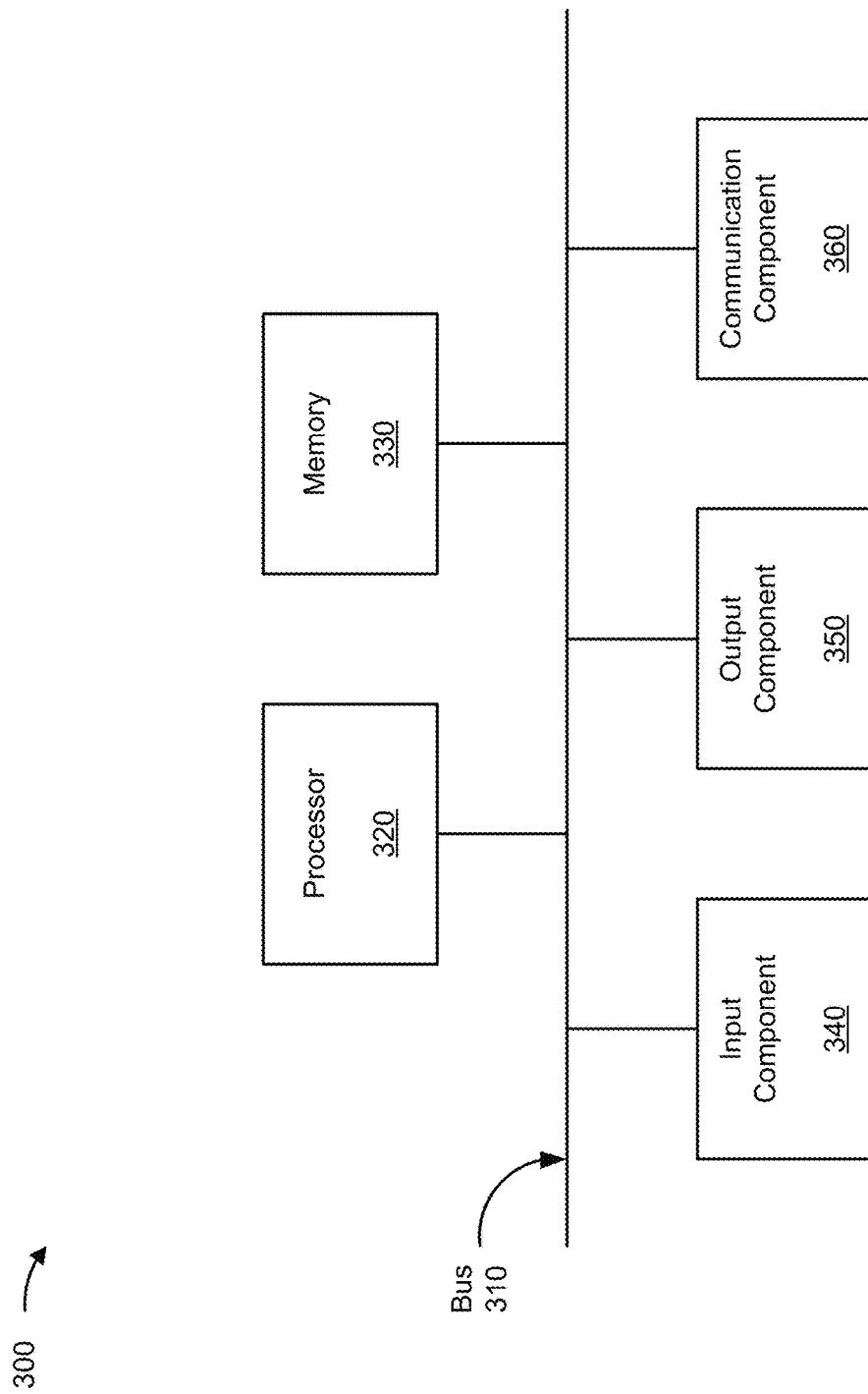
FIG. 3 is a diagram of example components of one or more devices of FIG. 2.

The operating system 210 may include system software capable of managing hardware of a user device (which may include, for example, one or more components of device 300 of FIG. 3) and providing an environment for execution of higher-level software, such as the mobile application 220. For example, the operating system 210 may include a kernel (e.g., a Windows-based kernel, a Linux kernel, a Unix-based kernel, such as an Android kernel, an iOS kernel, and/or another type of kernel) managing the hardware and library functions that may be used by the higher-level software. The operating system 210 may additionally provide a GUI and process input from a user.

The mobile application 220 may include an executable capable of running on a user device using the operating system 210. The mobile application 220 may communicate with the remote server 240. For example, the mobile application 220 may use hypertext transfer protocol (HTTP), file transfer protocol (FTP), and/or other Internet- or network-based protocols to request information from, transmit information to, and receive information from the remote server 240. Additionally, the mobile application 220 may communicate with the library 230 to adjust content descriptions, associated with the mobile application 220 and/or received from the remote server 240, to optimize audio signals generated based on the content descriptions, as described elsewhere herein.

The library 230 may include a plug-in or another type of software that the mobile application 220 may call using an API or another similar type of call to functions included in the library 230. In some implementations, the library 230 may be at least partially integrated into the mobile application 220. Additionally, or alternatively, the library 230 may at least partially operate independently of the mobile application 220. The library 230 may adjust content descriptions, associated with the mobile application 220 and/or received from the remote server 240, to optimize audio signals generated based on the content descriptions, as described elsewhere herein.

The remote server 240 may include remote computing devices that provide information to requesting devices over the Internet, a cellular network, a public land mobile network (PLMN), a local area network (LAN), a wide area network (WAN), a private network, and/or a combination of these or other types of networks). The remote server 240 may include a standalone server, one or more servers included on a server farm, or one or more servers spread across a plurality of server farms. In some implementations, the remote server 240 may include a cloud computing system (e.g., a system that performs virtualization (e.g., abstraction) of computing hardware (e.g., hardware described in connection with FIG. 3) to create one or more virtual computing systems). As an alternative, the remote server 240 may include one or more devices, such as device 300 of FIG. 3, that may include a standalone server or another type of computing device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300, which may correspond to a mobile device. In some implementations, a mobile device may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
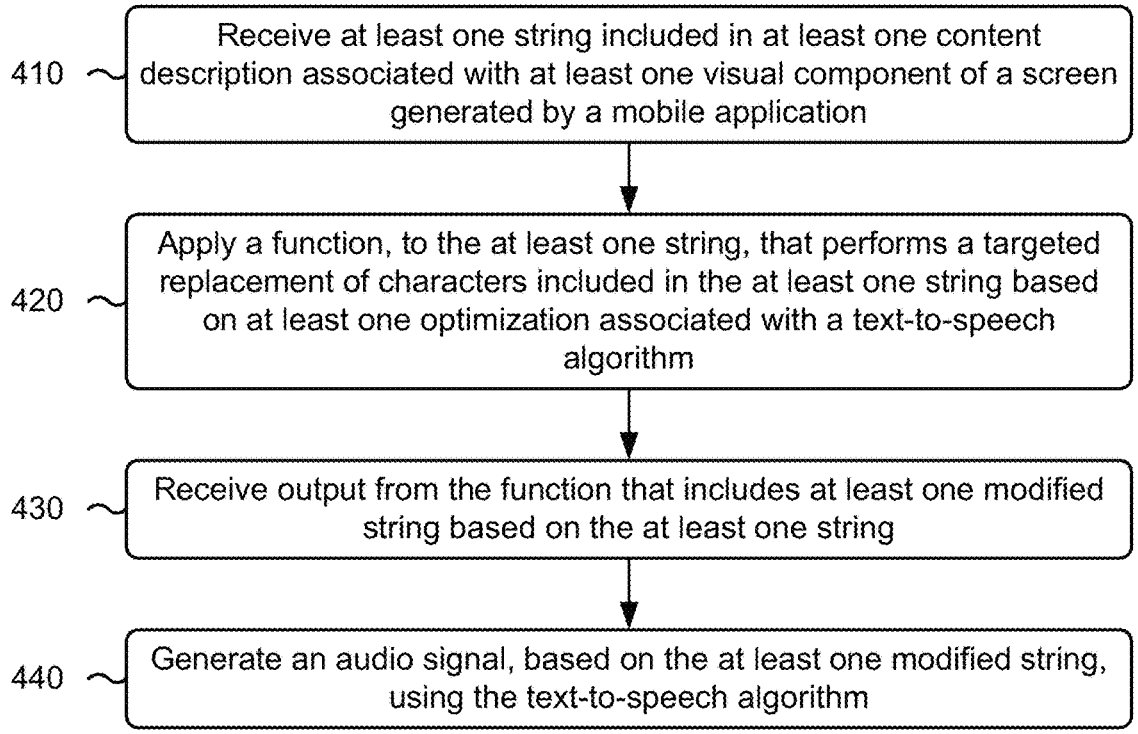
FIG. 4 is a flowchart of an example process relating to dynamically adjusting content descriptions for visual components.

FIG. 4 is a flowchart of an example process 400 associated with dynamic adjustment of content descriptions for visual components. In some implementations, one or more process blocks of FIG. 4 may be performed by a mobile application. In some implementations, one or more process blocks of FIG. 4 may be performed by another device or a group of devices separate from or including the mobile application, such as a mobile device. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving at least one string included in at least one content description associated with at least one visual component of a screen generated by a mobile application (block 410). As further shown in FIG. 4, process 400 may include applying a function, to the at least one string, that performs a targeted replacement of characters included in the at least one string based on at least one optimization associated with a text-to-speech algorithm (block 420). Additionally, or alternatively, process 400 may include applying a function, to the at least one string, that adds characters to the at least one string based on context associated with the at least one string. As further shown in FIG. 4, process 400 may include receiving output from the function that includes at least one modified string based on the at least one string (block 430). Accordingly, as shown in FIG. 4, process 400 may include generating an audio signal, based on the at least one modified string, using the text-to-speech algorithm (block 440).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for dynamically adjusting content descriptions for visual components, the system comprising:
   one or more memories; and
   one or more processors, communicatively coupled to the one or more memories, configured to:
      receive at least one string included in at least one content description associated with at least one visual component of a screen generated by a mobile application;
      apply a function to the at least one string, wherein:
         the function accepts, as input, an indication of whether a formant synthesis or a concatenative synthesis is used for a text-to-speech algorithm, and
         the function performs a replacement of characters included in the at least one string based on whether the text-to-speech algorithm uses the formant synthesis or the concatenative synthesis;
      receive output from the function that includes at least one modified string based on the at least one string; and
      generate an audio signal, based on the at least one modified string, using the text-to-speech algorithm.

2. The system of claim 1, wherein the replacement of characters is associated with a set of characters for replacing an acronym.

3. The system of claim 1, wherein the replacement of characters is associated with a set of characters for replacing an abbreviation.

4. The system of claim 1, wherein the replacement of characters is associated with a set of characters for replacing a term or a phrase.

5. The system of claim 1, wherein the one or more processors, to apply the function, are configured to:
   perform a call to the function, wherein the function is integrated with a class that is associated with the at least one string.

6. The system of claim 1, wherein:
   the at least one modified string includes phonetic spelling based on the text-to-speech algorithm using the concatenative synthesis that spells out pronunciations, or
   the at least one modified string includes vowel and consonant symbols based on the text-to-speech algorithm using the formant synthesis that uses international phonetic alphabet symbols for vowels and consonants.

7. The system of claim 1, wherein the at least one string is received from a library of strings stored in association with the mobile application.

8. The system of claim 1, wherein the at least one string is received by the mobile application from a remote server.

9. A method of dynamically adjusting content descriptions for visual components, comprising:
receiving at least one string included in at least one content description associated with at least one visual component of a screen generated by a mobile application;
applying a function to the at least one string, wherein:
the function accepts, as input, an indication of whether a formant synthesis or a concatenative synthesis is used for a text-to-speech algorithm, and
the function adds characters to the at least one string based on whether the text-to-speech algorithm uses the formant synthesis or the concatenative synthesis;
receiving output from the function that includes at least one modified string based on the at least one string; and
generating an audio signal, based on the at least one modified string, using the text-to-speech algorithm.

10. The method of claim 9, further comprising:
outputting the generated audio signal to a speaker.

11. The method of claim 9, further comprising:
updating the function by updating at least one library file storing code for the function.

12. The method of claim 9, wherein generating the audio signal comprises: calling a text-to-speech function with the at least one modified string as a parameter,
wherein the text-to-speech function is provided by an operating system associated with the mobile application.

13. The method of claim 9, wherein applying the function comprises: calling the function with the at least one string as a parameter,
wherein the function is stored in a library accessible by the mobile application.

14. The method of claim 13, wherein the at least one string comprises an instance of a string class, and wherein the function is provided as a public function for the string class.

15. A non-transitory computer-readable medium storing a set of instructions for dynamically adjusting content descriptions for visual components, the set of instructions comprising:
one or more instructions that, when executed by one or more processors of a device, cause the device to:
receive at least one string included in at least one content description associated with at least one visual component of a screen generated by a mobile application;
provide a first function or a second function, wherein:
the first function accepts, as input, the at least one string and an indication of whether a formant synthesis or a concatenative synthesis is used for a text-to-speech algorithm, and
the first function generates, as output, at least one modified first string, the first function performing a targeted replacement of characters included in the at least one string based on whether the text-to-speech algorithm uses the formant synthesis or the concatenative synthesis,
the second function accepts, as input, the at least one string and an indication of whether the formant synthesis or the concatenative synthesis is used for the text-to-speech algorithm, and
the second function generates, as output, at least one modified second string, the second function adding characters to the at least one string based on whether the text-to-speech algorithm uses the formant synthesis or the concatenative synthesis; and
generate an audio signal, based on the at least one modified first string or the at least one modified second string, using the text-to-speech algorithm.

16. The non-transitory computer-readable medium of claim 15, wherein the one or more instructions, when executed by the one or more processors, further cause the device to:
execute the first function based on an application programming interface (API) call to the first function.

17. The non-transitory computer-readable medium of claim 15, wherein the one or more instructions, when executed by the one or more processors, further cause the device to:
execute the second function based on an application programming interface (API) call to the second function.

18. The non-transitory computer-readable medium of claim 15, wherein the one or more instructions, when executed by the one or more processors, further cause the device to:
update the first function by updating at least one library file storing code for the first function.

19. The non-transitory computer-readable medium of claim 15, wherein the one or more instructions, when executed by the one or more processors, further cause the device to:
update the second function by updating at least one library file storing code for the second function.

20. The non-transitory computer-readable medium of claim 15, wherein the one or more instructions, when executed by the one or more processors, further cause the device to:
verify an application programming interface (API) call before executing the first function or the second function based on the API call.

* * * * *